US006921111B2

(12) United States Patent
Dyck et al.

(10) Patent No.: US 6,921,111 B2
(45) Date of Patent: Jul. 26, 2005

(54) REMOTELY ACTUATED QUICK-RELEASE COUPLING

(75) Inventors: Gerald Dyck, Abbotsford (CA); Paul Dries, Coquitlam (CA); Bryce Bendickson, Vancouver (CA)

(73) Assignee: Silvatech Global Systems Inc., Tortola (VG)

( * ) Notice: Subject to any disclaimer, the term of this patent is extended or adjusted under 35 U.S.C. 154(b) by 19 days.

(21) Appl. No.: 10/457,401

(22) Filed: Jun. 10, 2003

(65) Prior Publication Data

US 2004/0251684 A1 Dec. 16, 2004

(51) Int. Cl.⁷ .............................................. F16L 37/18
(52) U.S. Cl. ........................ 285/102; 285/920; 285/306; 285/310
(58) Field of Search ............................ 285/102, 920, 285/305, 306, 310

(56) References Cited

U.S. PATENT DOCUMENTS

| | | | | |
|---|---|---|---|---|
| 2,962,096 A | * | 11/1960 | Knox | 285/27 |
| 3,077,330 A | * | 2/1963 | Lampbear | 251/89.5 |
| 3,147,992 A | * | 9/1964 | Haeber et al. | 285/18 |
| 3,222,088 A | * | 12/1965 | Haeber | 285/18 |
| 3,321,217 A | * | 5/1967 | Ahlstone | 285/18 |
| 3,452,815 A | * | 7/1969 | Watkins | 166/344 |
| 3,492,027 A | * | 1/1970 | Herring | 285/18 |
| 3,554,579 A | * | 1/1971 | Brown | 285/18 |
| 3,675,713 A | * | 7/1972 | Watkins | 166/340 |
| 3,695,633 A | * | 10/1972 | Hanes | 285/18 |
| 3,847,413 A | * | 11/1974 | Gurley et al. | 285/316 |
| 4,200,312 A | * | 4/1980 | Watkins | 285/18 |
| 4,453,745 A | * | 6/1984 | Nelson | 285/18 |
| 4,516,795 A | * | 5/1985 | Baugh | 285/315 |
| 4,593,937 A | * | 6/1986 | Schawann et al. | 285/18 |
| 4,610,465 A | * | 9/1986 | Boyadjieff | 285/3 |
| 4,667,986 A | * | 5/1987 | Johnson et al. | 285/24 |
| 4,671,539 A | * | 6/1987 | Reneau | 285/18 |
| 4,693,497 A | * | 9/1987 | Pettus et al. | 285/12 |
| 4,708,376 A | * | 11/1987 | Jennings et al. | 285/315 |
| 4,761,023 A | * | 8/1988 | Troxell, Jr. | 285/18 |
| 5,098,132 A | * | 3/1992 | Burton | 285/18 |
| 5,890,871 A | | 4/1999 | Woerman | |
| 5,915,837 A | | 6/1999 | Brown et al. | |

* cited by examiner

Primary Examiner—Eric K. Nicholson
(74) Attorney, Agent, or Firm—Vermette & Co.

(57) ABSTRACT

A remotely actuated quick-release coupling having a male assembly and a female assembly. The female assembly has an inner sleeve and an outer sleeve, with the male assembly being removably insertable into the inner sleeve. A spring-loaded latching mechanism is located in the female coupling and is automatically engaged when the male assembly is inserted into the female assembly, connecting the coupling. The cylinder defined by the inner and outer sleeve can be pressurized through an external port using either air pressure or hydraulics. When the cylinder is pressurized, the latching mechanism is disengaged, allowing the male assembly to be removed from the female assembly, disconnecting the coupling.

9 Claims, 4 Drawing Sheets

REMOTELY ACTUATED QUICK-RELEASE COUPLING

FIELD OF INVENTION

This invention relates to quick release couplings for use with industrial equipment, and in particular to a quick-release coupling that can be remotely activated.

BACKGROUND OF THE INVENTION

Quick-connect and quick-release couplings are used in a variety of applications with heavy industrial equipment. The purpose of the coupling is to reduce the mounting/dismounting time of an assembly on the machine. One typical application is with the motor mounts on the engine/transmission assembly of a military vehicle, which often must be removed and reinstalled quickly.

Prior art couplings use spring-energized latching mechanisms and these couplings are connected by inserting the male component into the female receiver. To release the coupling, the latching mechanism must be forced back against the spring tension to allow the components to be separated. However, in many cases there are spatial limitations that inhibit direct access to the coupling, preventing disconnection. In such cases, a remote actuator can be used to release the coupling.

As an alternative, prior art couplings using hydraulics, such as that shown in U.S. Pat. No. 5,915,837 issued to Brown et al., are used. The hydraulic coupling can be actuated by the vehicle operator remotely from the location of the coupling. However, the coupling must be hydraulically actuated both for connection and for disconnection. This creates a risk of the coupling disengaging if hydraulic pressure is lost. A similar type of coupling, with the addition of a spring-loaded latching mechanism to function in conjunction with a gas charged accumulator is shown in U.S. Pat. No. 5,890,871 issued to Woerman.

There is a need for a quick-release coupling suitable for heavy industrial machinery that does not require hydraulics to engage the latching mechanism. Furthermore, the coupling should also allow for remote disconnection, to allow the coupling to be used in areas where a manual disconnection is neither easily achieved nor easily accessible.

It is an object of this invention to provide such a coupling.

SUMMARY OF THE INVENTION

The invention consists of a remotely actuated quick-release coupling. The coupling has a male assembly and a female assembly. The female assembly has an inner sleeve and an outer sleeve, with the male assembly being removably insertable into the inner sleeve. A spring-loaded latching mechanism is located in the female coupling and is automatically engaged when the male assembly is inserted into the female assembly, connecting the coupling. The cylinder defined by the inner and outer sleeve can be pressurized through an external port using either air pressure or hydraulics. When the cylinder is pressurized, the latching mechanism is disengaged, allowing the male assembly to be removed from the female assembly, disconnecting the coupling.

The coupling can also include a manual override to allow the latching mechanism to be manually disengaged without pressurization.

BRIEF DESCRIPTION OF THE DRAWINGS

The invention itself both as to organization and method of operation, as well as additional objects and advantages thereof, will become readily apparent from the following detailed description when read in connection with the accompanying drawings.

DETAILED DESCRIPTION OF THE INVENTION

Figure 1:
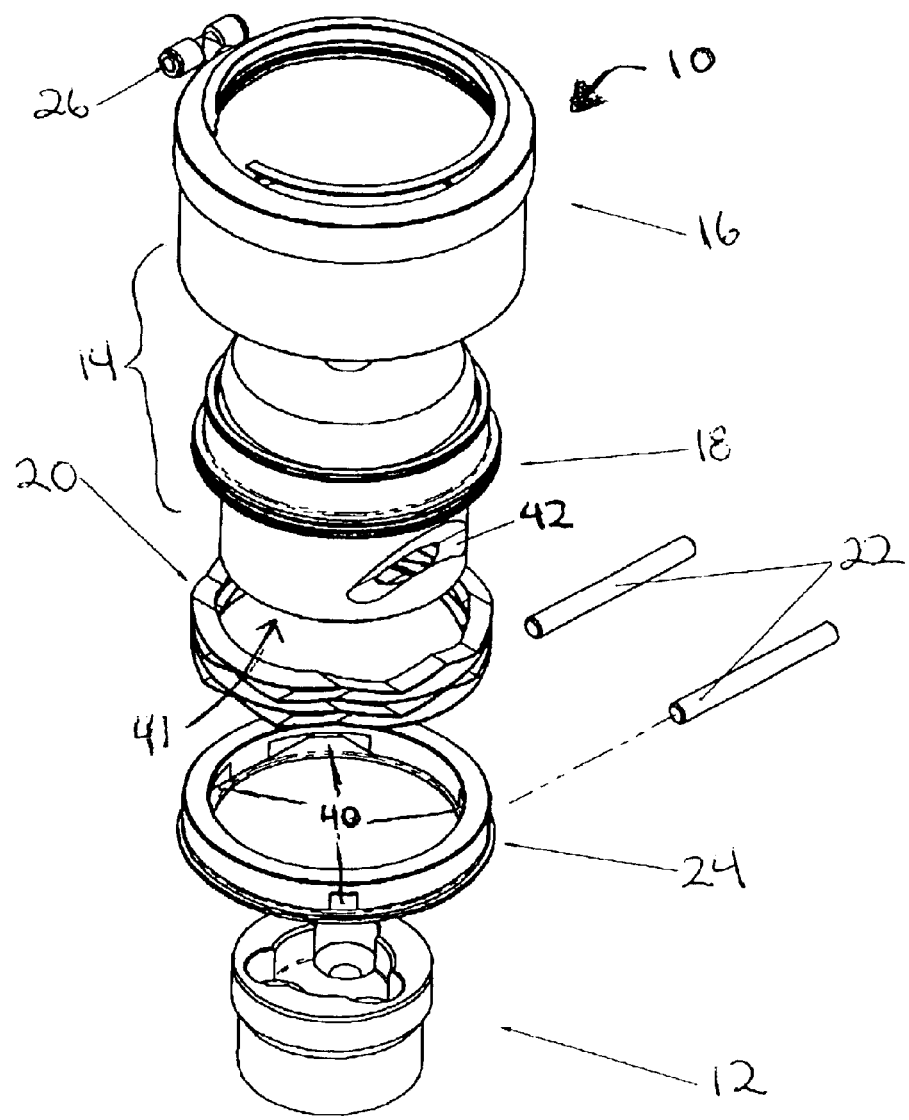
FIG. 1 is an exploded view of a quick-release coupling according to the present invention.
Figure 2:
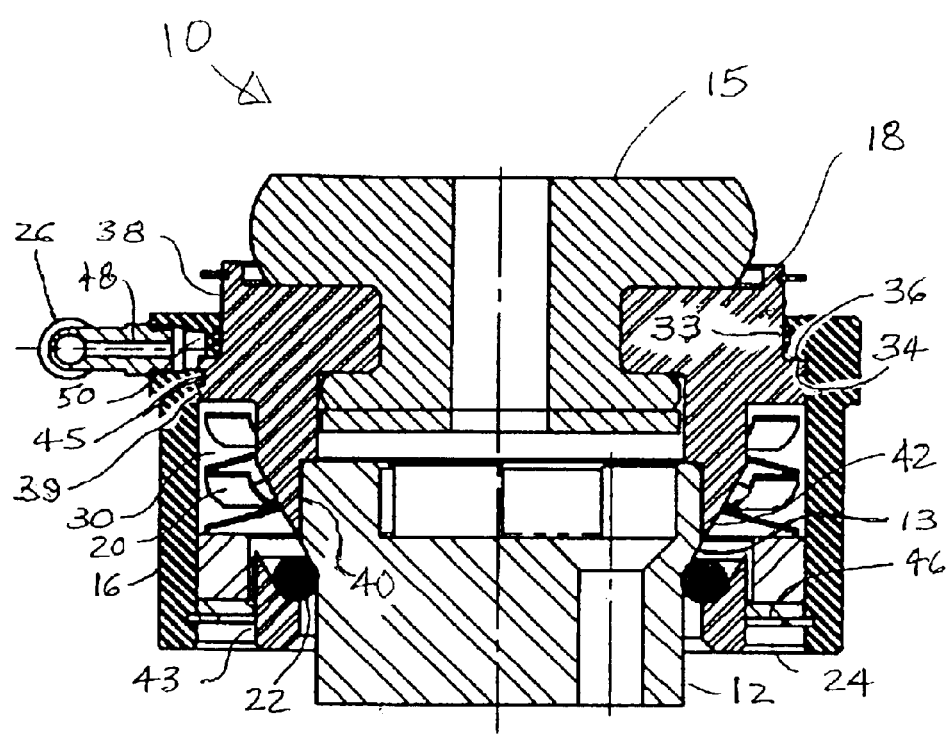
FIG. 2 is a sectional view of the coupling in a locked position.

Referring to the exploded view in FIG. 1 and the sectional view in FIG. 2, the coupling 10 couples a piece 15 to a base assembly 12 and consists of two parts: a male base assembly 12 and a female receiver assembly 14. The female assembly 14 has an outer sleeve 16 having at its top end an annular, inwardly protruding lip 33 with an annular shoulder 34 at the lower end of the lip 33. An inner sleeve 18 has a shoulder 36 on its outer surface which engages the annular shoulder 34. Lip 33 has an O-ring seal which sealingly engages an outer surface 38 and inner sleeve 18 has an outer surface portion 39 with an O-ring 45 which abuts and sealingly engages an interior surface of outer sleeve 16.

A base assembly 12 having a frustro-conical surface portion 13 slidingly fits into a lower annular recess 41 in inner sleeve 18. Formed into a lower cylindrical wall 43 of inner sleeve 18 are two angled slots 42. Two elongated retainer pins 22 slide in these slots 42. In their lowermost position as shown in FIG. 2, pins 22 engage the frustro-conical surface 13 and lock the base assembly 12 in annular recess 41.

A retainer cage 24 having four openings 40 for receiving the retainer pins 22 slides over the lower cylindrical wall 43 and has an outwardly projecting ring 46 which snaps into an annular slot on the interior surface of outer sleeve 16, thereby locking the retainer cage 24 to the outer sleeve 16. An annular spring pack 20 also slides over lower wall 43, and is compressed in a cylindrical chamber 30 against the top of the ends of retainer pins 22 biasing them down into the slots 42.

A pressure fitting 26 is mounted on the outer surface at the top of outer sleeve 16 and has fluid channel 48 which is in fluid communication with a fluid chamber 50 between the outer sleeve 16 and the inner sleeve 18.

Figure 3:
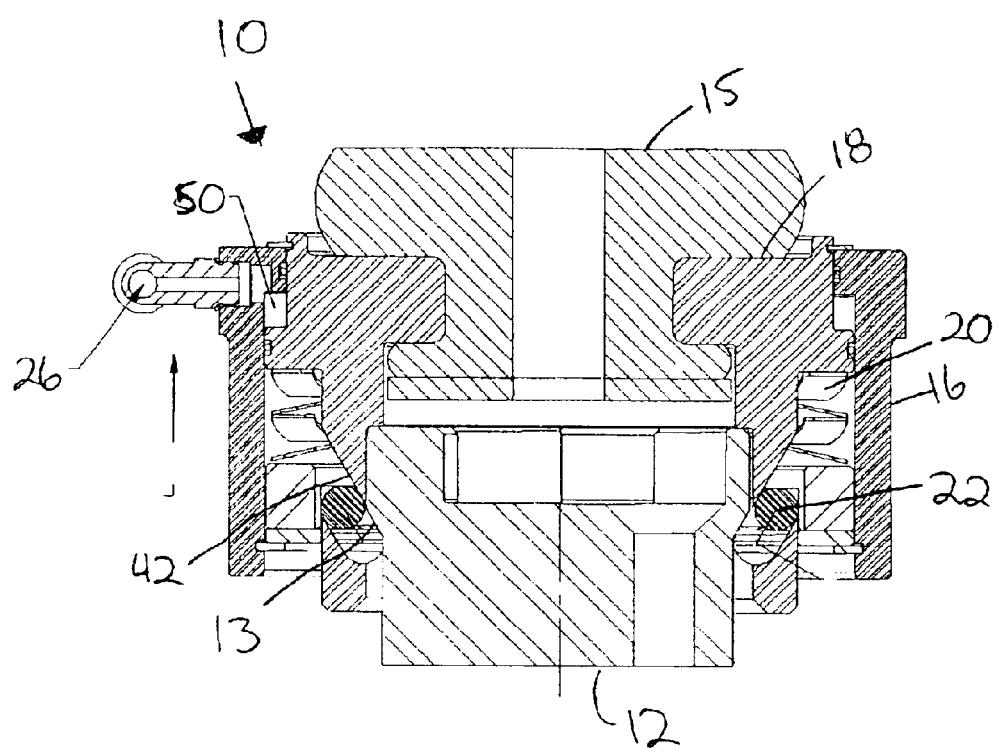
FIG. 3 is a sectional view of the coupling in an unlocked position.
Figure 4:
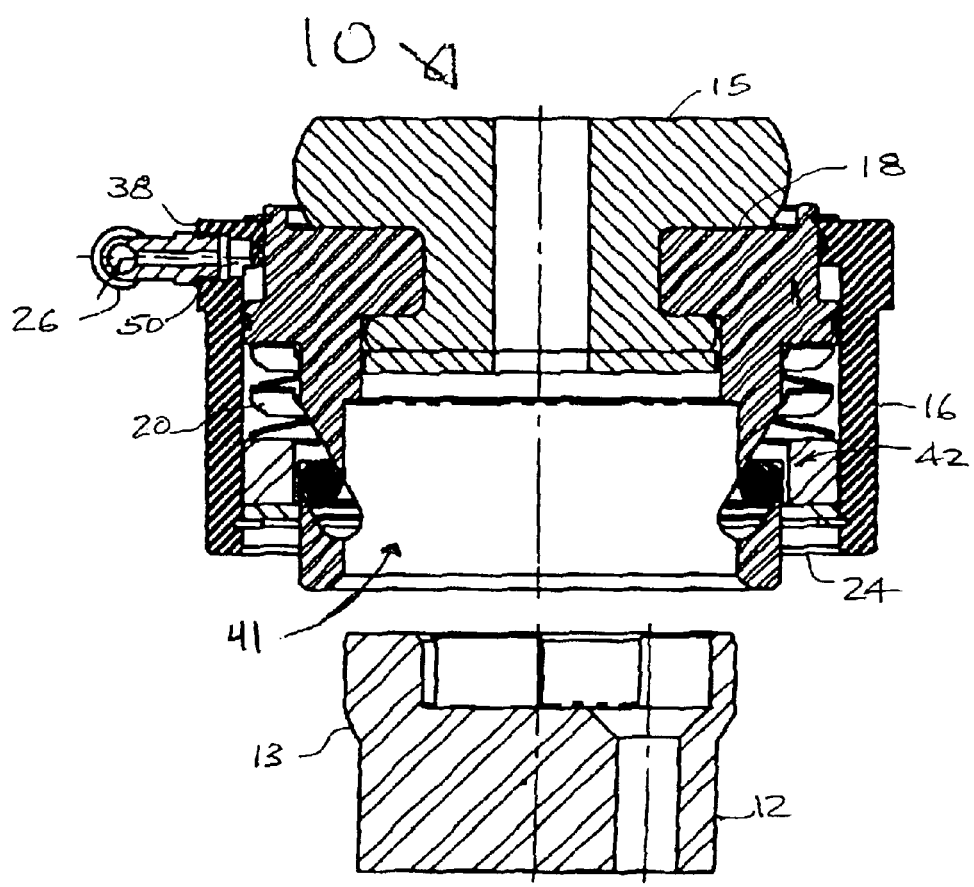
FIG. 4 is a sectional view of the coupling in an unlocked and disengaged position.

In operation, when fluid chamber 50 is unpressurized, the outer sleeve 16 is in the position shown in FIG. 2 in its lowermost position relative to the inner sleeve 18. With the base assembly 12 seated in recess 40, the pins 22 are biased against the frustro-conical surface 13 of the base assembly 12 locking the latter in place. Applying pressure to the fluid in fluid chamber 50 via pressure fitting 26 causes the outer sleeve 16 to move up relative to the inner sleeve 18 to the position shown in FIG. 3. The corresponding movement of retainer cage 24 causes movement of pins 22 upwardly and outwardly in slots 42 until they reach a position in which they no longer engage the frustro-conical surface 13. In the latter position the base assembly 12 is no longer locked in place and can be pulled out as shown in FIG. 4.

The coupling 10 may further include a mechanism to allow for manual disengagement of the coupling 10 in the event of pressure failure or other circumstances. Anything which enables upward movement of outer sleeve 16 relative to inner sleeve 18 by the application of physical force is acceptable. In certain applications, the outer sleeve 16 may be simply grabbed and moved upwards by a worker.

While the coupling 10 has been described as a mechanical coupling for securing two physical components (base assembly 12 and piece 15), the design can be readily adapted for other types of applications, such as fluid couplings.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

We claim:

1. A remotely actuated quick-release coupling, comprising:
   (a) a female assembly having an inner sleeve and an outer sleeve defining a chamber which can be pressurized;
   (b) a male assembly removably insertable into said inner sleeve of said female assembly;
   (c) a latching mechanism within said chamber operative to automatically couple said male assembly to said female assembly when said male assembly is fully inserted into said female assembly; and
   (d) a pressure fitting coupled to said outer sleeve and having a fluid passageway in fluid communication with said chamber enabling said chamber to be pressurized, disengaging said latching mechanism and allowing said male assembly to be removed from said female assembly.

2. The coupling of claim 1, wherein said latching mechanism includes one or more retainer pins slidably moveable in slots in said inner sleeve such that said retainer pins abut said male assembly when said latching mechanism is engaged.

3. The coupling of claim 1, further comprising a manual override mechanism that permits said latching mechanism to be disengaged without pressurizing said cylinder.

4. The coupling of claim 1, wherein said pressure fitting receives a compressed air input from a source external to said coupling.

5. The coupling of claim 2, wherein said retainer pins are additionally secured within a retainer cage which surrounds said inner sleeve of said female assembly.

6. The coupling of claim 2, wherein said male assembly has a sloped surface at its end such that said sloped surface engages said retainer pins and locks them against said slots automatically.

7. The coupling of claim 2, wherein said retainer pins are two in number and are located on opposite sides of said inner sleeve.

8. The coupling of claim 1, wherein said chamber is formed by a protruding lip on an inner surface of said outer sleeve and a protruding lip on an outer surface of said inner sleeve.

9. The coupling of claim 1, wherein said pressure fitting receives a hydraulic fluid input from a source external to said coupling.

* * * * *